May 11, 1965  E. SINGER  3,183,322
PRESSURE OPERATED ELECTRICAL DIFFERENTIAL SWITCHING DEVICES
Filed May 22, 1961  2 Sheets-Sheet 1
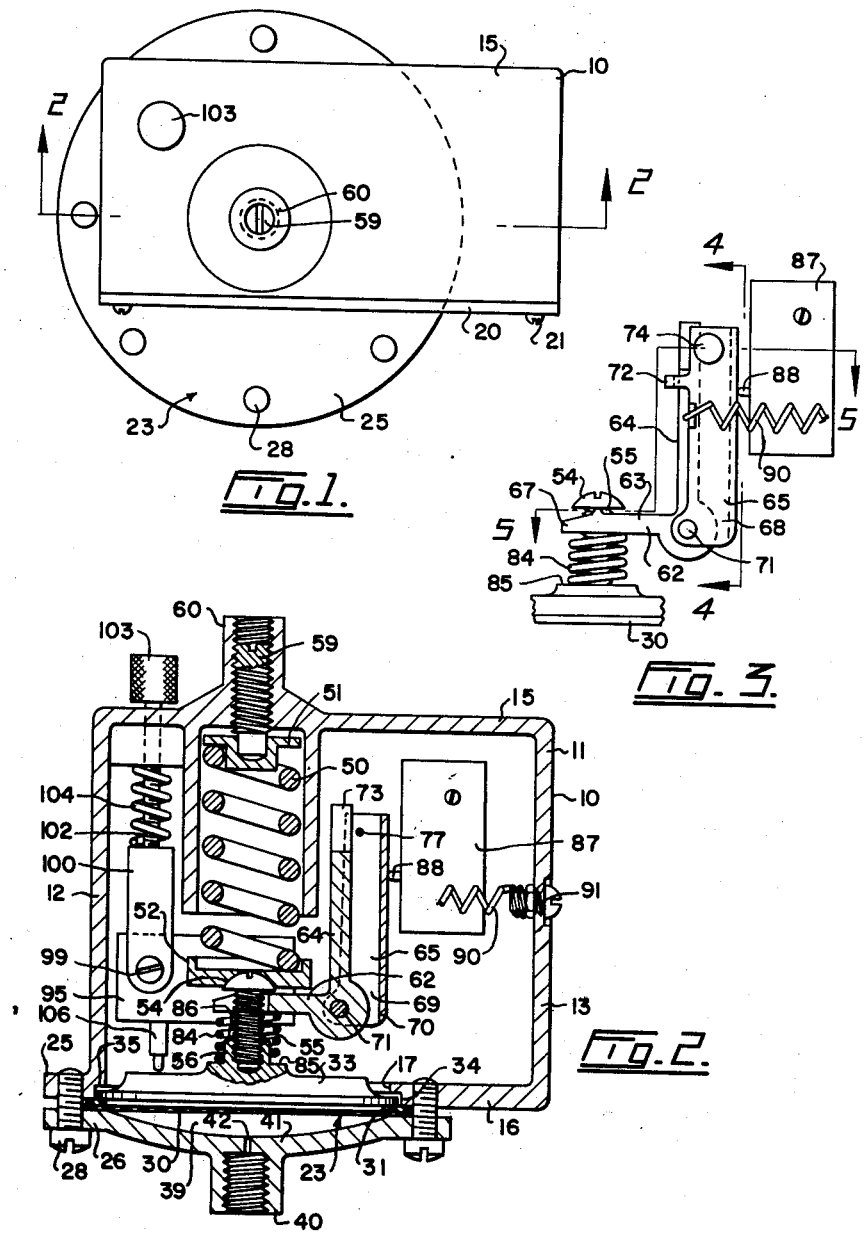
INVENTOR
ERNST SINGER
BY
Fetherstonhaugh & Co.
ATTORNEYS May 11, 1965  E. SINGER  3,183,322
PRESSURE OPERATED ELECTRICAL DIFFERENTIAL SWITCHING DEVICES
Filed May 22, 1961  2 Sheets-Sheet 2
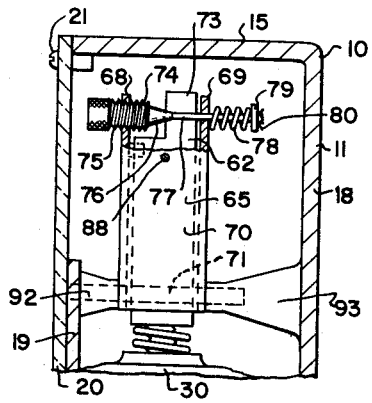
Fig. 4.
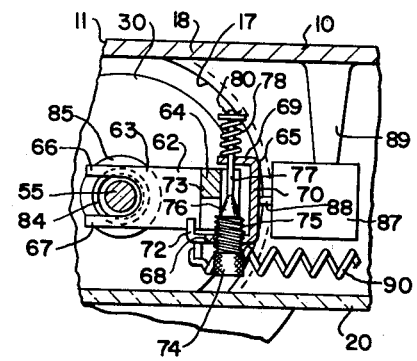
Fig. 5.
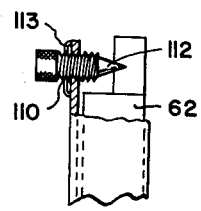
Fig. 7.
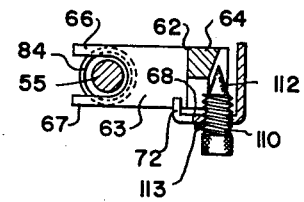
Fig. 8.
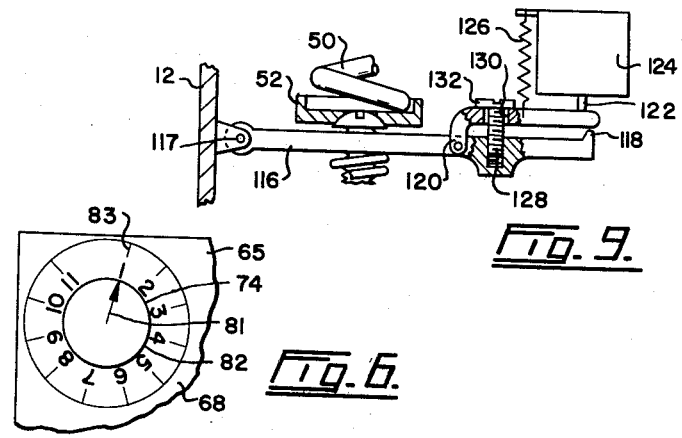
Fig. 9.
Fig. 6.
INVENTOR
ERNST SINGER
BY
Fetherstonhaugh & Co.
ATTORNEYS United States Patent Office 3,183,322
Patented May 11, 1965

3,183,322
PRESSURE OPERATED ELECTRICAL DIFFERENTIAL SWITCHING DEVICES
Ernst Singer, 3491 Puget Drive, Vancouver,
British Columbia, Canada
Filed May 22, 1961, Ser. No. 111,602
8 Claims. (Cl. 200—83)

This invention relates to a pressure operated switching device for controlling an electrical circuit, that is, for opening or closing said circuit.

An object of the present invention is the provision of a pressure operated switching device for controlling an electrical circuit under predetermined conditions.

The present switching device is such that it may be used for many different purposes. It is operated by pressure to control an electrical circuit which is intended to set something into operation which is required as a result of an increase or decrease in the pressure which operates the switch. The pressure may be against a diaphragm, piston or bellows, such as when this device is connected to a pressure line. The switch operates the electric circuit when the pressure in the line reaches a predetermined point, such circuit controlling whatever is necessary to vary the line pressure and the circuit control remains until the line pressure has dropped to another predetermined point. The pressure may be in a bellows due to temperature changes, such as when the device is used as a temperature controller, or it may be the pressure of a liquid in a level controlling set-up.

Another object of the invention is the provision of a pressure operated switching device of extremely simple construction and which having only positive switching actions, is virtually vibration proof.

A pressure operated switch according to the present invention comprises a pressure element adapted to be moved by pressure to which it is exposed during use, pressure means opposing the movement of the element, an actuator mounted near the pressure element, said actuator comprising a pivotally mounted lever and a follower element coupled to said lever and movable therewith, said lever being movable relative to the follower between predetermined and adjustable limits corresponding to a desired pressure differential, and a plunger operated switch for controlling an electric circuit, said switch positioned to have its plunger moved by the follower upon predetermined movement of said lever beyond one of said limits by the pressure element to operate the switch.

Other features which may be included in accordance with the invention will be described hereinafter and referred to in the appended claims.

The invention will now be more particularly described with reference to the accompanying drawings, in which:

FIGURE 1 is a top plan view,
FIGURE 2 is a sectional view on the line 2—2 of FIGURE 1,
FIGURE 3 is a side elevational view showing the switching mechanism,
FIGURE 4 is a sectional view on the line 4—4 of FIGURE 3,
FIGURE 5 is a sectional view on the line 5—5 of FIGURE 3,
FIGURE 6 shows the pressure differential adjustment dial,
FIGURE 7 is a side elevation view partly in section of an alternative form of limit adjustment means,
FIGURE 8 is a top view partly in section of the limit adjustment means of FIGURE 7, and
FIGURE 9 shows details of a further form of switching mechanism.

Referring to FIGURES 1 to 6 of the drawings, 10 is a preferred form of pressure operated switch including a casing 11 of any desired construction. The illustrated casing has end walls 12 and 13, a top 15 and a bottom 16 with a relatively large opening 17 therein, a back wall 18 and a front wall 19. A cover member 20 may be removably positioned over the front of the casing and secured in place in any desired manner, such as by means of screws 21. The cover member 20 is preferably made of a transparent plastic material, although any other suitable material may be employed.

In this form of the invention, the pressure element is a diaphragm but it is to be understood that said element may be a piston or a bellows. A diaphragm unit 23 is connected to casing 11 at the bottom opening 17 thereof in any convenient manner. In this example, unit 23 consists of a top 25 and a bottom 26, said top and bottom being generally circular in shape and the bottom being connected to the top in any suitable manner, such as by bolts 28 positioned near the peripheries thereof. A diaphragm 30 is clamped between top 25 and bottom 26 of unit 23 within bolts 28. This diaphragm is formed of rubber or other suitable material. In this example, unit top 25 is integrally formed with casing 11 at the bottom thereof so that it surrounds the bottom opening 17, or in other words, the interior of the casing communicates with the interior of unit 23 above diaphragm 30 thereof through opening 17. A zero ring 31 is positioned so as to rest against the upper surface of diaphragm 30 and provides a bearing surface for a backing plate 33 which slidably fits against or preferably just clears an interior annular wall 34 of unit 23. A shoulder 35 is formed in top 25 at the upper edge of wall 34, said shoulder extending over but being spaced from the upper surface of backing plate 33 when diaphragm 30 is in its neutral or non-extended position.

Bottom 26 of unit 23 is formed so as to provide an inlet chamber 39 within the unit beneath diaphragm 30. An internally threaded boss 40 is formed integral with and projects downwardly from bottom 26 centrally thereof. The inner end of boss 40 preferably is closed off from chamber 39 by a wall 41 excepting for a small orifice 42 in said wall.

Diaphragm 30 forms the pressure element of pressure operated switch 10. In one application of this switch device, as shown in the drawings, a fluid under pressure is supplied through a suitable pipe to boss 40. With this arrangement, the fluid pressure is applied to the under-surface of diaphragm 30. The orifice 42 protects the diaphragm from sudden pressure surges or, in other words, it is an anti-surge orifice.

Pressure means is provided in casing 11 to oppose the movement of the pressure element or diaphragm 30. In this example, the pressure means is in the form of a main spring 50 extending between upper and lower cup-like seats 51 and 52. The lower seat rests on the dome-shaped head 54 of a bolt 55 which is threaded into a boss 56 projecting from the upper surface of backing plate 33. The pressure of spring 50 may be adjusted by a screw 59 threaded through an upwarly projecting boss 60 on the top 15 of casing 11.

An actuator unit is provided within casing 11 near the pressure element or diaphragm 30. The actuator unit includes a bell crank lever 62 and a follower 65. The bell crank lever 62 includes a lower arm 63 and an upper arm 64. Lower arm 63 is near and substantially parallel with diaphragm 30 and said arm is bifurcated to form side members 66 and 67 extending at opposite sides of bolt 55 and beneath the head 54 thereof. The follower 65 consists of an elongated generally channel-shaped member having side walls 68 and 69 interconnected by a web 70. The lever 62 and follower 65 are pivotally mounted in the casing by means of a pivot pin 71 journalled at opposite ends in bosses 92 and 93 projecting inwardly from the front and back walls 18 and 19 respectively of casing 11. Pin 71 passes through apertures formed in the lower ends of side walls 68 and 69 of follower 65 and a hole extending through the junction of arms 63 and 64 of lever 62. The lever 62 and follower 65 are thus mounted on a common pivot and upon relative rotation of lever 62 with respect to follower 65, arm 64 is movable into and out of the recess formed in follower 65 by side walls 68 and 69 thereof.

A stop member 72 is mounted on or formed integrally with the wall 68 of follower 65 and extends away therefrom. The stop 72 is effective to limit the counterclockwise movement of the lever 62 about pivot 71 relative to follower 65.

Adjustable limit means are provided for limiting the clock-wise movement of lever 62 about pivot 71 relative to the follower 65. This adjustable limit means is in a form of a screw 74 having a body portion 75 threadably engaged in the wall 68 of follower 65 and an elongated stem portion 77 which is connected to or formed integrally with the body portion 75 by a cone shaped section 76. The free end of stem 77 extends through an aperture in wall 69 of follower 65 and is resiliently secured in this position by means of a spring 78 mounted on the stem 77 and held in position thereon by means of a washer 79 and a suitable locking device, such as a split pin 80. The cone shaped section 76 of screw 74 is adapted to engage the upper end 73 of arm 64 of lever 62, thereby to limit the clockwise movement of lever 62 relative to follower 65. The extent of this relative movement may be varied by turning the adjustment screw 74 to alter the position of the cone-shaped section 76 relative to lever 62. When the minimum amount of relative movement is desired, the adjustment screw 74 is moved to its minimum setting by turning it inwardly to a position whereat the cone shaped section 76 thereof engages the upper end of the lever 62 and forces the lever laterally into engagement with stop member 72. In this case, there is no independent movement between the follower 65 and the lever 62, they move as a unit. To enable the lever 62 to move relative to follower 65, it is merely necessary to turn the adjustment screw 74 in a counterclockwise direction thereby to disengage the cone shaped section 76 from the upper end of lever 62 whereupon the lever is free to move independently of the follower 65 between the limits set by the stop member 72 and the cone shaped section 76 of screw 74. In this manner, any desired degree of free movement of lever 62 relative to follower 65 within predetermined limits may be selected by suitable rotation of adjustment screw 74. To assist in selecting the desired setting the adjustment screw 74 is provided with a pointer 81 on the head portion 82 thereof, said pointer adapted to traverse a suitable calibrated dial 83 which may be secured to the outer surface of wall 68 of follower 65. The degree of relative movement between the lever 62 and follower 65 governs the pressure differential of the switch. Thus, for example, if the pressure controller is to be set at 50 pounds and is required to have a differential of 10 pounds, the tension on main spring 50 would be adjusted so that it exerts a pressure of 50 pounds and the adjustment screws 74 would be set so that the lever 62 would not engage the cone shaped section 76 until the pressure reaches 60 pounds. In this manner, therefore, any selected differential setting may be obtained by turning the differential adjustment screw 74.

Compressible means is provided between lever 62 and pressure element of diaphragm 30. This compressible means is in the form of a spring 84 which extends between a shoulder 85 formed on the backing plate boss 56 and the lower surface of the bifurcated end of lever arm 63. The side members 66 and 67 of the lever lower arm 63 rest on this spring 84 so that normally said side members bear against the spring and the head 54 of bolt 55. Spring 84 forms an automatic centering means for backing plate 33 so that the periphery of the latter is clear of wall 34 in unit 23. For this purpose, the lower end of spring 84 fits over a reduced portion 86 of boss 56.

A snap action switch 87 is carried by an arm 89 fixed to and projecting inwardly from the back wall 19 of casing 11. This switch is aligned with and spaced from the upper end of the follower 65 and has an operating plunger 88 projecting therefrom and engaging the follower. Switch 87 is of the type that requires a certain operating or switching force against plunger 88 to cause it to operate and has a smaller release or return force. In other words, the switch includes spring means for resisting the inward movement of plunger 88 and which after the switch is operated exerts less force to return the plunger to its normal position. These switches are well known in the trade and switches may be obtained requiring different operating or switching forces.

A holding spring 90 is adjustably connected at one end by a screw 91 to wall 13 of casing 11, and is secured at its other end to the follower 65. The spring 90 is normally effective to urge the follower into engagement with the switch plunger 88 and is selected so that it exerts a force on the switch plunger 88 which is less than the switch actuating force but which is greater than the switch release or return force. The spring 90 is thus effective to maintain the switch plunger 88 in its operated position once it has been moved to that position by the follower 65 by virtue of the difference between the operating force and the release force of the switch. In an alternative form of the invention (not shown), the holding spring 90 may be dispensed with and its function performed by means of a magnet mounted on the switch 87 and co-operating pole piece fixedly secured to the follower 65. If desired, instead of a separate pole piece, the follower could be fabricated from a suitable magnetic material so that the follower itself acts as a pole piece. With this arrangement, the strength of the magnet would be selected so that it normally attracts the follower and maintains it in engagement with the switch plunger 88 with a force which is less than the switch actuating force but which is greater than the switch release or return force.

It will be noted that main spring 50 opposes the movement of diaphragm 30 and the action of the pressure of the fluid at inlet 40. The spring loading of plunger 88 opposes the action of spring 84 when the latter is pushed upwardly by the diaphragm.

Switch 87 is adapted to control an electrical circuit, not shown, either by opening or closing said circuit. If pressure operated switch 10 is intended to keep the pressure from rising above a predetermined level, the circuit controlled by switch 87 will operate the circuit thereof to cause suitable apparatus or mechanism to function in order to lower the pressure.

A second snap action switch 95 is mounted in casing 11 near diaphragm 30. It is preferable to be able to adjust the position of switch 95. In this example, one end of switch 95 is swingably connected to a boss formed on the inner surface of the back wall 19 of the casing, while the opposite end of said switch is pivotally connected at 99 to the lower end of an arm 100, the upper end of which is bent and adapted to receive a screw 102 which is threaded through the top 15 of the casing and has a knob 103 on its outer end. A spring 104 extends between the end of arm 100 and the inner surface of top 15.

Switch 95 has a downwardly extending operating plunger 106 with its free end just above the upper surface of backing plate 33. With this arrangement, when the backing plate is moved upwardly a predetermined distance by diaphragm 30, it operates switch 95. This switch may control an electrical circuit which also controls the mechanism or apparatus which is intended to change the pressure or it may serve some other useful purpose. Switch 95 may function as a safety switch so that if anything happens to switch 87, and it does not operate when it should at the time the pressure reaches a level for which the switch 10 is set, a further increase in the pipe pressure will cause switch 95 to be operated to do the necessary job. Switch 95 is operated before backing plate 33 moves high enough to engage shoulder 35 in the top 25 of diaphragm unit 23. Therefore, should both switches fail and the pressure continue to rise, the backing plate will engage shoulder 35 before the various elements of switch 10 are damaged by the excessive pressure.

The operation of this switching device 10 is very simple. The pressure of main spring 50 is adjusted by turning screw 59 in order to set the pressure at which the switch should operate to say, for example, 50 pounds. Thus, as the pressure against diaphragm 30 reaches the set level, the diaphragm commences to move upwardly against the pressure of spring 50, said movement being transferred against the spring 50 through bolt 55. Movement of the diaphragm 30 causes lever 62 to pivot independently of the follower 65 until the upper end of the lever 62 engages the cone shaped section 76 of the adjustment screw 74 which occurs when the desired differential pressure has been attained. Thereafter, further movement of lever 62 produces similar and corresponding movement of follower 65 to depress plunger 88 until switch 87 is operated. This action operates the circuit controlled by switch 87 to cause the necessary apparatus to function to change the pressure. The spring means of switch 87 is such that once the switch is operated, a smaller release or return force is exerted on the plunger than was necessary to depress it. Upon decreasing the pressure, the diaphragm is moved downwardly and the head 54 of bolt 55 under the influence of main spring 50 moves the bifurcated arm 63 of the lever 62 downwardly in order to return the latter to its original position. During the initial part of the return movement of lever 62, it travels independently of follower 65. When the pressure has been reduced to the desired setting, the lever 62 engages the stop 72 of follower 65. When the force exerted by the lever on the follower exceeds the difference between the force exerted by the holding spring 90 and the release force of the switch, follower swings outwardly with the lever. With this arrangement, the pressure changes to the desired level as set by the main spring before the pressure changing apparatus is put out of action as a result of the plunger 88 of switch 87 returning to its released position.

As has been stated, operation of switch 87 is effective to complete an electrical circuit which controls the mechanism or apparatus for reducing the line pressure. If, however, for any reason the pressure should continue to rise beyond that set by the switch 87, the backing plate 33 will continue to move upwardly and since further rotation of lever 62 and follower 65 is inhibited by their engagement with switch plunger 88, the upward movement of backing plate 33 will be resisted by the pressure of pressure travel spring 84. Spring 84 will allow this plate movement to continue without damaging switch 87. When the over reaches a predetermined value as set by the spring 84, the backing plate 33 is moved upwardly against the pressure of spring 84 into engagement with the plunger 96 of switch 95 to operate the latter switch. The amount of over pressure necessary to operate switch 95 is controlled by spring 84 and by suitable selection of this spring may be varied within preselected limits. Switch 95 thus may act as a safety switch and should switch 87 malfunction when the pressure reaches the level for which the switching device is set, a further increase in the pressure as determined by spring 84 is effective to operate switch 95 to do the necessary job.

As an example of the operation of this pressure controller, let it be assumed that the switch actuating force is 10 ounces and release force is 6 ounces and that the holding spring exerts a force of 8 ounces. In this case, a force of 2 ounces is required to operate the switch. The lever 62 thus moves inwardly about its pivot as the pressure increases beyond the pressure set by spring 50 thereby moving the diaphragm upwardly. The first part of the lever movement is free until the pressure exerted thereon reaches the desired maximum as set by the adjustable limit means whereupon it engages the cone shaped section 76 of adjustment screw 74. Thereafter, the follower moves with the lever and exerts an increasing pressure on the switch plunger 88. When the pressure exerted on the follower by lever 62 reaches the required 2 ounces, the switch is operated and remains in that position. As the pressure decreases, the lever swings outwardly about its pivot but the follower remains stationary since the release force of 6 ounces is not sufficient to overcome the holding spring tension of 8 ounces. Eventually, the lever engages the stop 72 on the follower 65 and pulls the latter with it. When the pull force exerted on the follower by the lever exceeds 2 ounces, the switch plunger is restored to its normal position.

It will be appreciated that the foregoing describes only one form of the invention and that many variations in detail can be envisaged. Thus, for example, as shown in FIGURES 7 and 8, the differential adjustment screw may comprise a screw 110 formed with a tapered end portion 112 which can be adjustably positioned relative to the lever 62 to limit the movement thereof. In this form of the invention, the adjustment screw is not provided with a supporting stem connected to the tapered portion as in the first described embodiment. However, a spring wire 113 mounted on follower wall 68 resiliently presses against the said screw 110 to prevent accidental rotation thereof.

In another form of the invention, as shown in FIGURE 9, the actuator unit includes a lever 116 pivotally connected at one end 117 to the side wall 12 of casing 11 and provided at its other end with a stop 118. An L-shaped follower member 120 is pivotally connected at one end to the lever 116 and has its other end urged into contact with the plunger 122 of a pressure operated switch 124 corresponding to switch 87 by means of a spring 126. The spring 126 is normally effective to bias the follower 120 against switch plunger 122 with a force less than the switch actuating force but greater than the switch release or return force. A set screw 128 is passed freely through an aperture 130 formed in follower 120 and is threadedly engaged with the lever. The head 132 of screw 128 is effective to limit the relative movement of lever 116 and follower 120 in one direction whilst the stop 118 limits the relative movement in the other direction. The range of relative movement between lever 116 and follower 120 and consequently the differential pressure range of the switch 10 may thus be adjusted by varying the setting of screw 128.

If desired, a screw arrangement such as illustrated between lever 116 and follower 120 may be substituted for the stop 72 in the first-described embodiment of the invention.

What I claim as my invention is:

1. An electrical differential switching device comprising a pressure element adapted to be moved by pressure to which it is exposed during use, a pivotally mounted actuator lever, means connecting the pressure element to the lever to cause said element to move the lever in one direction around its pivotal mounting when the pressure element is moved by pressure, pressure means bearing against the lever and opposing the movement of the pressure element, a pivotally mounted follower element beside the lever movable both therewith and relative thereto, limiting means between the lever and follower element permitting relative movement between the lever and the follower element between predetermined limits, a plunger-operated switch for controlling an electric circuit, said switch requiring a certain operating force and having a smaller return force, said switch being positioned to have its plunger moved by the follower element upon predetermined movement of said lever beyond one of said limits by the pressure element to operate the switch, means for adjusting said limiting means to adjust said one of said limits without moving the follower element relative to the actuator lever, and a coil spring connected to the follower element spaced away from the pivotal mounting thereof and normally drawing said follower element into engagement with the switch plunger with a force less than the switch operating force and greater than the switch return force, whereby said coil spring is effective to maintain the plunger in the switch-operated position until the lever reaches one of said predetermined limits to move the follower element therewith against the action of said coil spring.

2. A switching device as claimed in claim 1 in which the means for adjusting said one of said limits is mounted on the follower element.

3. An electrical differential switching device comprising a pressure element adapted to be moved by pressure to which it is exposed during use, a pivotally mounted actuator lever, resiliently compressible means between and interconnecting the pressure element and the lever to cause said element to move the lever in one direction around its pivotal mounting when the pressure element is moved by pressure, pressure means bearing against the lever and opposing the movement of the pressure element, a follower element beside the lever movable both therewith and relative thereto, limiting means between the lever and follower element permitting relative movement between the lever and the follower element between predetermined limits, a plunger-operated switch for controlling an electric circuit, said switch requiring a certain operating force and having a smaller return force, said switch being positioned to have its plunger moved by the follower element upon predetermined movement of said lever beyond one of said limits by the pressure element to operate the switch, said resilient means absorbing any movement of said pressure element after the switch has been operated, means for adjusting said limiting means to adjust said one of said limits without moving the follower element relative to the actuator lever, and biasing means connected to the follower element spaced from the pivotal mounting thereof normally urging said follower element into engagement with the switch plunger with a force less than the switch operating force and greater than the switch return force, whereby said biasing means is effective to maintain the plunger in the switch-operated position until the lever reaches one of said predetermined limits to move the follower element therewith against the action of the biasing means.

4. A switching device as claimed in claim 3 including a second plunger-operated switch having a plunger operable by the pressure element after said pressure element has moved the lever sufficiently to cause the follower element to operate the first-mentioned switch.

5. A switching device as claimed in claim 3 in which the means for adjusting said one of said limits comprises a screw threaded in the follower and having a conical section extending past a portion of the actuator lever, said screw being so positioned relative to the lever that rotation of the screw moves said conical section towards and away from the lever depending upon the direction of rotation of the screw.

6. A switching device as claimed in claim 5 including means engaging said screw to prevent accidental rotation thereof.

7. An electrical differential switching device comprising a pressure element adapted to be moved by pressure to which it is exposed during use, an L-shaped lever having a lower arm and an upper arm connected together at adjacent ends, a pivotal mounting for the lever connected thereto at the juncture of the lower and upper arms, resiliently compressible means between and interconnecting the pressure element and the lever lower arm to cause said element to move the lever in one direction around its pivotal mounting when the pressure element is moved by pressure, pressure means bearing against said lower arm and opposing the movement of the pressure element, a follower pivotally mounted on said pivotal mounting and extending along said upper arm movable both therewith and relative thereto, limiting means on the follower and engageable with the upper arm and permitting relative movement between the upper arm and the follower between predetermined limits, a plunger-operated switch for controlling an electric circuit, said switch requiring a certain operating force and having a smaller return force, said switch being positioned to have its plunger moved by the follower upon predetermined movement of said upper arm beyond one of said limits by the pressure element to operate the switch, means for adjusting said limiting means to adjust said one of said limits without moving the follower relative to the lever upper arm, and a coil spring connected to the follower spaced away from the pivotal mounting thereof and normally drawing said follower into engagement with the switch plunger with a force less than the switch operating force and greater than the switch return force, whereby said coil spring is effective to maintain the plunger in the switch-operated position until the lever upper arm reaches one of said predetermined limits to move the follower therewith against the action of said coil spring.

8. An electrical differential switching device comprising a pressure element adapted to be moved by pressure to which it is exposed during use, a straight lever having first and second ends, a pivotal mounting for the lever connected thereto at the first end thereof, resiliently compressible means between and interconnecting the pressure element and the lever adjacent the pivotal mounting thereof to cause said element to move the lever in one direction around its pivotal mounting when the pressure element is moved by pressure, pressure means bearing against the lever and opposing the movement of the pressure element, a follower having an end pivotally mounted on the lever at a point spaced from the second end of the lever, said follower extending along the lever towards said second end thereof movable with and relative to the lever, limiting means between the follower and the lever permitting relative movement between the lever and the follower between predetermined limits, a plunger-operated switch for controlling an electric circuit, said switch requiring a certain operating force and having a smaller return force, said switch being positioned to have its plunger moved by the follower upon predetermined movement of said lever beyond one of said limits by the pressure element to operate the switch, means for adjusting said limiting means to adjust said one of said limits without moving the follower relative to said lever, and biasing means connected to the follower spaced from the pivotally mounted end thereof normally urging said follower into engagement with the switch plunger with a force less than the switch operating force and greater than the switch return force, whereby said biasing means is effective to maintain the plunger in the switch-operated position until the lever reaches one of said predetermined limits to move the follower therewith against the action of the biasing means.

References Cited by the Examiner
UNITED STATES PATENTS
2,489,422   11/49   Kuhn _____ 200—83

BERNARD A. GILHEANY, *Primary Examiner.*

WALTER STOLWEIN, *Examiner.*